Oct. 30, 1945.      R. SMITH      2,387,811
TRAP
Filed Aug. 19, 1943      2 Sheets-Sheet 1
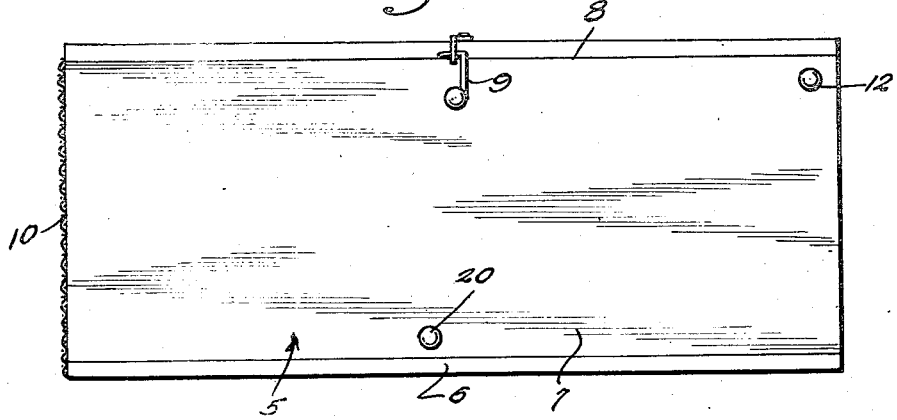
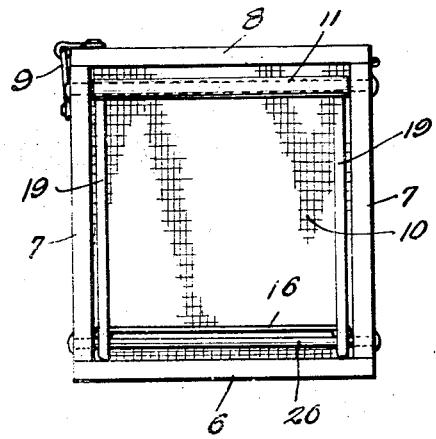 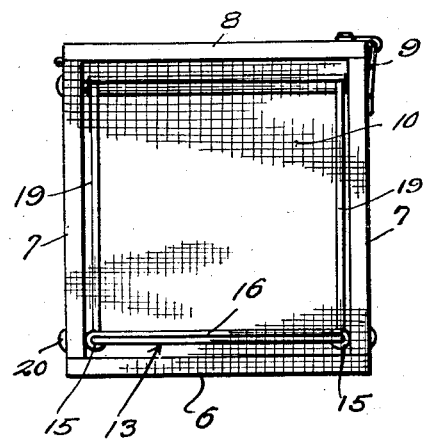
Inventor
Russell Smith
By Clarence A. O'Brien
and Harvey B. Jacobson, Attorney Oct. 30, 1945.  R. SMITH  2,387,811
TRAP
Filed Aug. 19, 1943  2 Sheets-Sheet 2
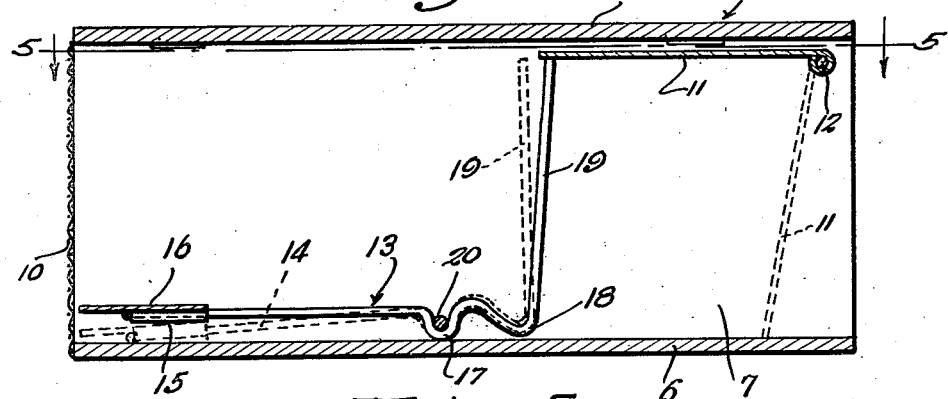
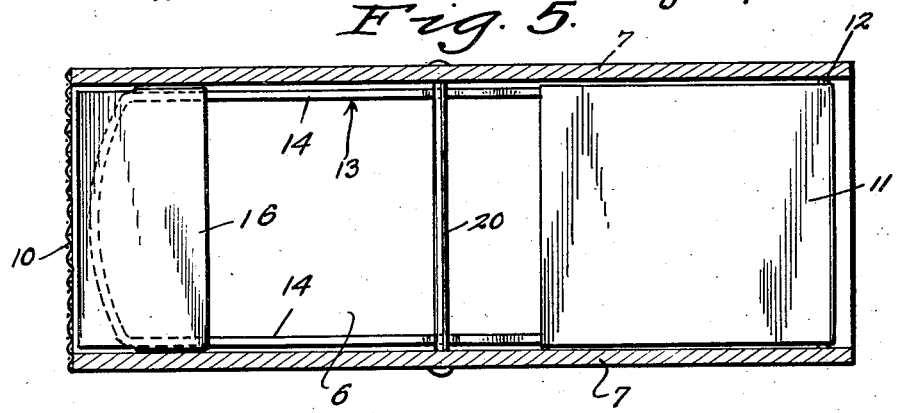
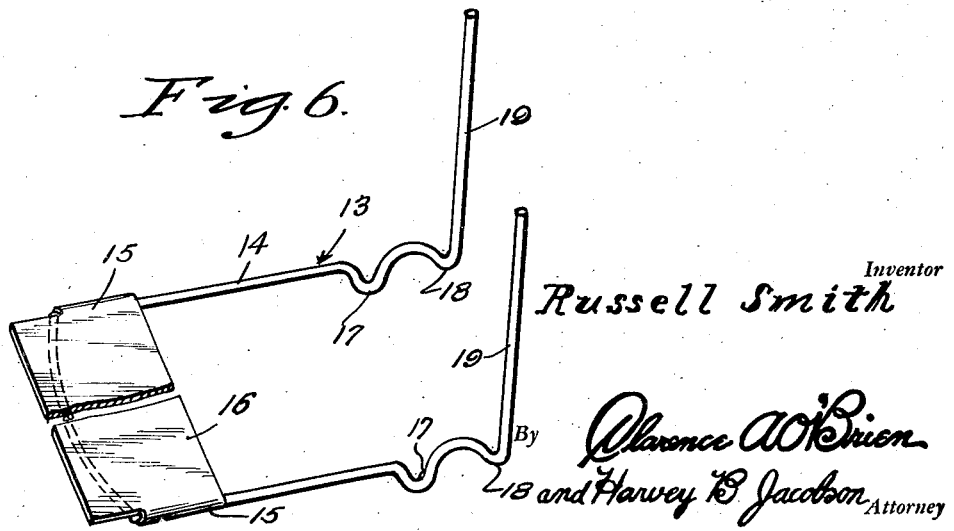
Inventor
Russell Smith Patented Oct. 30, 1945

2,387,811

UNITED STATES PATENT OFFICE 2,387,811

TRAP

Russell Smith, Martinsville, Ind.

Application August 19, 1943, Serial No. 499,259

1 Claim. (Cl. 43—61)

This invention appertains to new and useful improvements in traps for catching various species of animals.

The principal object of the present invention is to provide a trap which is quick-acting and substantially foolproof in operation.

Another important object of the invention is to provide a trap wherein the parts are of simple construction and brief in number, to the end that the trap can be manufactured at a low cost.

Other objects and advantages of the invention will become apparent to the reader of the following description.

In the drawings:

Figure 1 is a side elevational view of the trap.

Figure 2 is an end elevation looking at one end of the trap.

Figure 3 is an end elevation looking at the opposite end of the trap.

Figure 4 is a longitudinal sectional view.

Figure 5 is a horizontal longitudinal sectional view, taken on line 5—5 of Figure 4.

Figure 6 is a fragmentary perspective view of the treadle, and closure trip unit.

Referring to the drawings wherein like numerals designate like parts, it can be seen that numeral 5 generally refers to a box-like structure made up of a bottom wall 6 and side walls 7. This box-like structure is provided with a hinged top 8 provided with a suitable latch 9 and has a foraminous sheet 10 closing one end thereof.

In the opposite end of the box-like structure 5 is a swingable closure 11, this closure consisting of a sheet of metal rolled at one end to form a barrel through which a rod 12 is disposed in bridging relation between the upper portion of the side walls 7.

Numeral 13 generally refers to a treadle and trip unit and this is made up of a U-shaped wire member 14 having its side leg portions adjacent its bight passing through short barrels 15, 15 at the ends of a treadle plate 16. The free end portions of the leg portions of the U-shaped member 14 are bent downwardly and upwardly as at 17 and then downwardly as at 18 and upwardly to provide upstanding supports 19 for supporting the closure plate 11 in the manner shown in Figure 4. The downwardly offset portions 17 provide transversely aligned journals, and extending transversely across the legs of the wire member 14 within these journals, as well as fixed in the sides of the box-like structure, is a pivot rod 20. The offsets 18 contact the bottom wall of the trap when the inner portions of member 14 are substantially horizontally disposed as shown by full lines in Figure 4 and the upper ends of the outer portions 19 of said member 14 are engaged under the open closure 11.

Obviously, bait can be placed in the trap on or adjacent to the treadle 16 and when an animal enters the box-like structure and steps on the treadle plate 16, the upstanding supporting members 19 will be moved to the left in Figure 4, that is, to the dotted line position due to the fulcruming action of the unit 13, thus releasing the closure plate 11 so that it may gravitate to the closed position shown in dotted lines.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a trap provided with a bottom wall and having a pivoted closure adapted to be swung upwardly to open position and to swing downwardly by gravity to closed position, a treadle and trip unit for releasably holding the closure open, said unit comprising a U-shaped wire member having similar legs bent to provide inner portions and outer terminal end portions disposed substantially at right angles to each other, said inner portions being downwardly offset to provide U-shaped transversely aligned journals near the junctures of said inner and outer portions and being further offset downwardly at said junctures to contact the bottom wall of the trap when the inner portions are substantially horizontally disposed in spaced relation to and above said bottom wall and the upper ends of the outer portions are engaged under the open closure, a fixed pivot rod extending transversely across said inner portions within said journals, and a treadle plate secured on and bridging said inner portions adjacent the intermediate portion of the wire member.

RUSSELL SMITH.